US012701026B2

(12) United States Patent
Huang

(10) Patent No.: US 12,701,026 B2
(45) Date of Patent: Aug. 4, 2026

(54) METHOD, APPARATUS, AND STORAGE MEDIUM FOR PRESENTING INFORMATION OF VIDEO CONFERENCE PARTICIPANTS

(71) Applicant: HybriU Inc., Dover (DE)

(72) Inventor: Jin Huang, Lynnwood, WA (US)

(73) Assignee: HYBRIU INC., Dover (DE)

( * ) Notice: Subject to any disclaimer, the term of this patent is extended or adjusted under 35 U.S.C. 154(b) by 127 days.

(21) Appl. No.: 18/794,978

(22) Filed: Aug. 5, 2024

(65) Prior Publication Data

US 2025/0254059 A1    Aug. 7, 2025

(30) Foreign Application Priority Data

Feb. 7, 2024    (CN) .......................... 202410175582.0

(51) Int. Cl.
| | |
|---|---|
| *H04L 12/18* | (2006.01) |
| *G06F 3/14* | (2006.01) |
| *H04L 65/1089* | (2022.01) |
| *H04L 65/403* | (2022.01) |

(52) U.S. Cl.
CPC ........ *H04L 12/1831* (2013.01); *G06F 3/1454* (2013.01); *H04L 65/1089* (2013.01); *H04L 65/403* (2013.01)

(58) Field of Classification Search
CPC ............. H04L 12/1831; H04L 65/1089; H04L 65/403; G06F 3/1454
See application file for complete search history.

(56) References Cited

U.S. PATENT DOCUMENTS

| | | | | |
|---|---|---|---|---|
| 7,768,543 | B2 * | 8/2010 | Christiansen | ......... H04L 65/752 |
| | | | | 348/14.08 |
| 9,294,726 | B2 * | 3/2016 | Decker | ................ H04N 5/2628 |
| 9,819,877 | B1 * | 11/2017 | Faulkner | ................ H04N 7/147 |
| 9,942,516 | B1 * | 4/2018 | Pell | ......................... H04L 65/80 |
| 10,681,300 | B1 * | 6/2020 | Meccarelli | ............. H04N 7/152 |

(Continued)

OTHER PUBLICATIONS

Redmond, Tony. Dynamic View and Other Improvements Coming for Teams Meetings. Mar. 5, 2021, pp. 1-4 [online], [retrieved on Feb. 4, 2026]. Retrieved from the Internet <https://office365itpros.com/2021/03/05/teams-dynamic-view/> (Year: 2021).*

*Primary Examiner* — Olisa Anwah
(74) *Attorney, Agent, or Firm* — PROCOPIO, CORY, HARGREAVES & SAVITCH LLP

(57) ABSTRACT

The method comprises: Step S1: receiving a media stream pushed by a terminal and determining the camera state of the terminal, if the camera of the terminal is ON, then proceeding to Step S2; if the camera of the terminal is OFF, then proceeding to Step S3; Step S2: displaying the media stream of the terminal in a predetermined size in a first predetermined area; and Step S3: displaying the media stream of the terminal in a reduced size in a second predetermined area. Disclosed in embodiments of the present application is a method for presenting information of video conference participants, which enables a participant to intuitively learn information about other participants, by showing their information in the first area or the second area presented locally based on the camera state of their respective terminals, thus greatly improving the conference communication efficiency and the user experience.

14 Claims, 17 Drawing Sheets

(56)  References Cited

U.S. PATENT DOCUMENTS

| 11,064,256 | B1 * | 7/2021 | Voss | H04N 21/47 |
|---|---|---|---|---|
| 11,416,831 | B2 * | 8/2022 | Rajamani | G06F 16/345 |
| 11,632,404 | B2 * | 4/2023 | Cox | H04L 65/80 |
| | | | | 348/14.09 |
| 12,368,819 | B2 * | 7/2025 | Gehrmann | H04N 21/4312 |
| 12,449,961 | B2 * | 10/2025 | Chang | G06F 3/04886 |
| 12,500,783 | B1 * | 12/2025 | Nelson | H04L 12/1818 |
| 2018/0373485 | A1 * | 12/2018 | Cyr | G06F 3/04845 |
| 2019/0166330 | A1 * | 5/2019 | Ma | H04L 65/403 |
| 2022/0011925 | A1 * | 1/2022 | Tao | G06F 3/16 |
| 2025/0080599 | A1 * | 3/2025 | Ahnoff | G06V 20/41 |

* cited by examiner

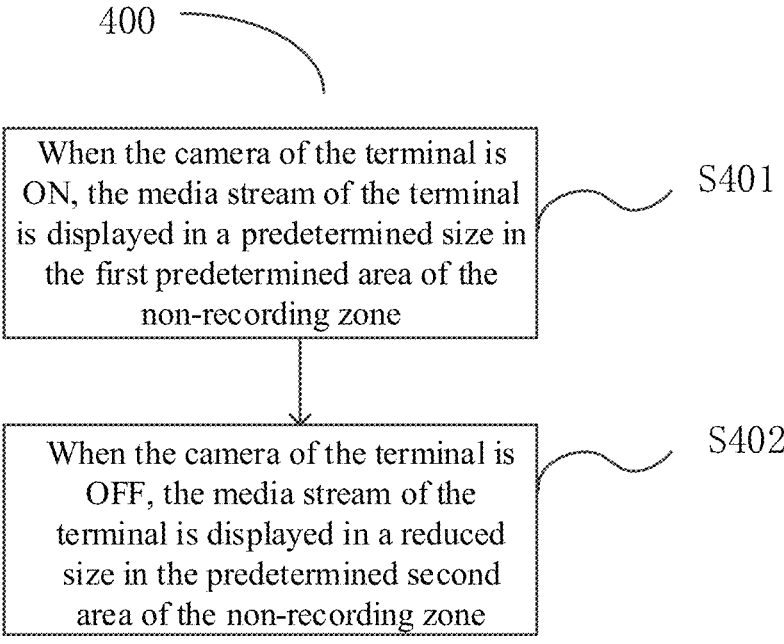

400

| |
|---|
| When the camera of the terminal is ON, the media stream of the terminal is displayed in a predetermined size in the first predetermined area of the non-recording zone |

S401

| |
|---|
| When the camera of the terminal is OFF, the media stream of the terminal is displayed in a reduced size in the predetermined second area of the non-recording zone |

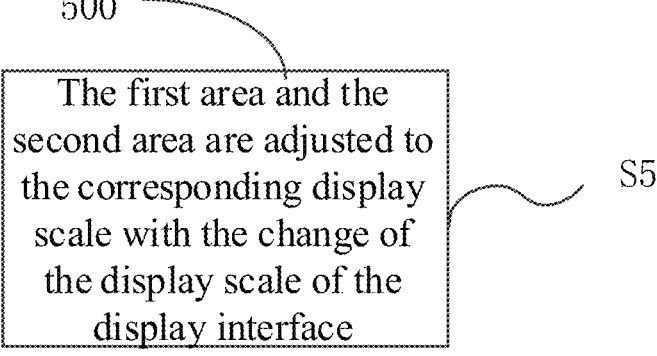

500

| |
|---|
| The first area and the second area are adjusted to the corresponding display scale with the change of the display scale of the display interface |

METHOD, APPARATUS, AND STORAGE MEDIUM FOR PRESENTING INFORMATION OF VIDEO CONFERENCE PARTICIPANTS

CROSS-REFERENCE TO RELATED APPLICATIONS

This application claims priority from CN 2024101755820, filed Feb. 7, 2024. The entire content of the priority application is incorporated herein by reference.

FIELD OF THE INVENTION

The present application relates to the field of communication technology, and more particularly, to a method, an apparatus, and a storage medium for presenting information of video conference participants.

BACKGROUND OF THE INVENTION

Video conferencing is a kind of multimedia communication technology that enables people in different places to realize communication in real-time, visual and interactive ways through certain transmission medium. It can distribute various information such as static/dynamic images, voice, text, pictures and the like of the characters to the terminal devices of each user through various existing electrical communication transmission media, so that geographically dispersed users can exchange information through various means such as graphic and sound, making participants feel like they are immersed in meetings in the same venue. With the development of video conferencing, the needs of users are becoming more and more abundant, requiring not only to transmit images and videos of characters, but also to transmit shared files, programs, etc. However, in the existing video conference systems on the market, when it comes to multiple participants, the preview images of other participants other than the presenter are displayed in the same size and in a fixed position in the conference video interface, so that the preview images of the participants whose cameras are OFF will take up a lot of the display area, making other participants unable to intuitively perceive the information of different participants. Therefore, it is necessary to provide a new method of displaying information about different participants in a more intuitive way during video conferences.

SUMMARY OF THE INVENTION

The present application is made in view of at least one of the above-mentioned technical problems existing in the prior art. In a first aspect of the present application, there is provided a method for presenting information of video conference participants, comprising:

Step S1: receiving a media stream pushed by a terminal and determining the camera state of the terminal, if the camera of the terminal is ON, then proceeding to Step S2; if the camera of the terminal is OFF, then proceeding to Step S3;

Step S2: displaying the media stream of the terminal in a predetermined size in a first predetermined area; and Step S3: displaying the media stream of the terminal in a reduced size in a second predetermined area.

In some embodiments, the first predetermined area is further set as a recording zone first predetermined area located in a recording zone of the video conference and/or a non-recording zone first predetermined area located in a non-recording zone of the video conference; the second predetermined area is further set as a recording zone second predetermined area located in the recording zone of the video conference and/or a non-recording zone second predetermined area located in the non-recording zone of the video conference; and the first predetermined area and the second predetermined area are respectively set as, a recording zone first predetermined area and a recording zone second predetermined area when the participant is a panelist, or a non-recording zone first predetermined area and a non-recording zone second predetermined area when the participant is not a panelist.

In some embodiments, the method further comprises:
receiving a shared file sent by the terminal; and
causing the media stream and/or the shared file to be displayed in a predetermined order in the first predetermined area of the recording zone.

In some embodiments, the first predetermined area of the recording zone comprises a first sub-area and a second sub-area, where the first sub-area is used for displaying the shared file, and the second sub-area is used for displaying the media stream or streams corresponding to at least one presenter; wherein the second sub-area is located on the left side and/or the right side of the first sub-area.

In some embodiments, wherein the media stream or streams corresponding to the presenter or presenters are displayed in an enlarged size in the second sub-area when there are no more than two presenters; and the media streams of the presenters are displayed in a second predetermined size in the second sub-area when there are more than two presenters.

In some embodiments, wherein the shared file at least comprises: a document, a PPT presentation, a chart, a video, and/or a remote desktop.

In some embodiments, the method further comprises:
detecting whether there is a voice signal sent by the terminal; and
if there is a voice signal, playing the voice signal.

In some embodiments, the method further comprises:
adjusting the first area and the second area to the corresponding display scale with the change of the display scale of the display interface.

In a second aspect of the embodiments of the present application, there is provided an apparatus for presenting information of video conference participants, comprising:

a receiving module, configured to receive a media stream pushed by a terminal and determine the camera state of the terminal;

a first display module, configured to display the media stream of the terminal in a predetermined size in a first predetermined area when the camera of the terminal is ON; and a second display module, configured to display the media stream of the terminal in a reduced size in a second predetermined area when the camera of the terminal is OFF.

In a third aspect of the embodiments of the present application, there is provided a storage medium, having stored thereon a computer program, which, when executed by a processor, causes the processor to carry out the method for presenting information of video conference participants as described above.

Disclosed in embodiments of the present application is a method for presenting information of video conference participants, which enables a participant to intuitively learn information about other participants, by showing their information in the first area or the second area presented locally based on the camera state of their respective terminals, thus greatly improving the conference communication efficiency and the user experience.

BRIEF DESCRIPTION OF THE DRAWINGS

In order to more clearly explain the technical schemes in the embodiments of the present application, the following will briefly introduce the drawings needed in the description of the embodiments. Obviously, the drawings in the following description are only some embodiments of the present application. Those of ordinary skill in the art can also obtain other drawings based on these drawings without any creative effort.

FIG. 4 illustrates a schematic flow chart of the display process of a spectator and a viewer according to an embodiment of the present application;

FIG. 5 illustrates a schematic flow chart of the process of adjusting the first area and the second area to the corresponding display scale with the change of the display scale of the display interface, according to an embodiment of the present application;

DETAILED DESCRIPTION OF THE PREFERRED EMBODIMENTS

In order to enable those skilled in the art to better understand the technical schemes of the embodiments of the present application, the following will clearly and completely describe the technical schemes in the embodiments of the present application with reference to the accompanying drawings in the embodiments of the present application. Obviously, the described embodiments are only a part of the embodiments of the present application, rather than all the embodiments. Based on the embodiments in the present application, all the other embodiments obtained by persons of ordinary skill in the art without making creative efforts fall within the scope of the present application.

Based on at least one of the above technical problems, the present application provides a method for presenting information of video conference participants, comprising: Step S1: receiving a media stream pushed by a terminal and determining the camera state of the terminal, if the camera of the terminal is ON, then proceeding to Step S2; if the camera of the terminal is OFF, then proceeding to Step S3; Step S2: displaying the media stream of the terminal in a predetermined size in a first predetermined area; and Step S3: displaying the media stream of the terminal in a reduced size in a second predetermined area. Disclosed in embodiments of the present application is a method for presenting information of video conference participants, which enables a participant to intuitively learn information about other participants, by showing their information in the first area or the second area presented locally based on the camera state of their respective terminals, thus greatly improving the conference communication efficiency and the user experience.

Figure 1:
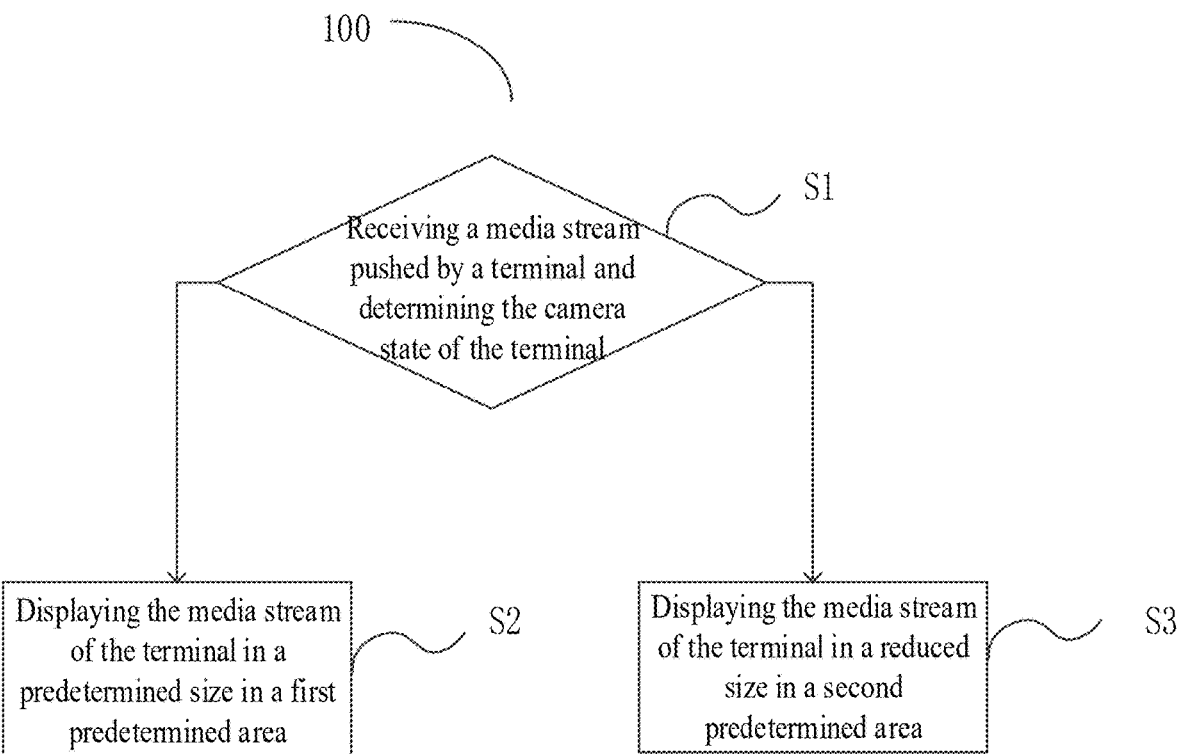
FIG. 1 illustrates a schematic flow chart of the method for presenting information of video conference participants according to an embodiment of the present application.

FIG. 1 illustrates a schematic flow chart of the method for presenting information of video conference participants according to an embodiment of the present application. As shown in FIG. 1, the method 100 for presenting information of video conference participants according to an embodiment of the present application may comprise the following steps S1, S2 and S3:

In Step S1, a media stream pushed by a terminal is received and a determination on whether the camera of the terminal is ON is made. If the camera of the terminal is ON, then proceeding to Step S2; and if the camera of the terminal is OFF, then proceeding to Step S3.

The present application can be used for video conferencing, and also for application scenarios such as online teaching. In this embodiment, video conferencing is used as an example for description.

An executor of the embodiment of the present application may be a local terminal, wherein the local terminal first establishes a communication connection with a remote terminal and then detects the camera state of the remote terminal, to determine which and how information of the participant corresponding to the remote terminal is presented in a local display interface according to the camera state of the remote terminal.

The media stream of the embodiment of the present application comprises at least one of: a video stream taken by a camera of the terminal in real time, an avatar set by the terminal, a nickname of a participant corresponding to the terminal, or a default image presented when the terminal neither opens the camera nor sets the avatar.

In some embodiments of the present application, the camera state of a remote terminal may be detected in a number of ways. For example, a remote terminal automatically sends the state of its own camera to a local terminal. For another example, a local terminal sends a request for acquiring a video stream to a remote terminal, and the camera state of the terminal can be learnt according to the response content sent by the remote terminal. For the third example, a local terminal detects a remote device to which a remote connection has been established, to learn the camera state of the remote terminal.

In one embodiment of the present application, an operation may be performed to a media stream corresponding to a terminal whose camera is OFF to display the media stream in a first predetermined area. The specific operation mode may be when the cursor is moved to the media stream: double-clicking the left mouse button, or first pressing and holding the left mouse button to drag the media stream directly to a designated position in the first predetermined area and then releasing the mouse to enable the media stream to be displayed at the designated position, or rather, "pinning" the media stream at the designated position.

In the application scenario of a video conference, different permissions may be set for the participants by the administrator or presenter. In one example, a first part of participants are granted the permissions to change the camera state and interact; a second part of participants are granted the permissions to change the camera state; and a third part of participants are prohibited to change the camera state. In another example, the conference presenter can control to enable the small avatar feature. When the camera of a participant's terminal is ON, the conference presenter can control whether the camera of the participant's terminal needs to be turned off, so that the media stream sent by the participant's terminal will be in reduced display (for example, displaying a default picture, in a display size smaller than the predetermined size). The conference presenter can also control to disable the small avatar feature, and once the small avatar feature is disabled, the participant is unable to change the displayed media stream into reduced display (for example, displaying a default picture, in a display size smaller than the predetermined one).

In Step S2, the media stream of the terminal is displayed in a predetermined size in a first predetermined area.

In an embodiment of the present application, it is possible for the video conferencing software to display each terminal locally in a predetermined size, while the media streams corresponding to these remote terminals are displayed in the first predetermined area.

Figure 2:
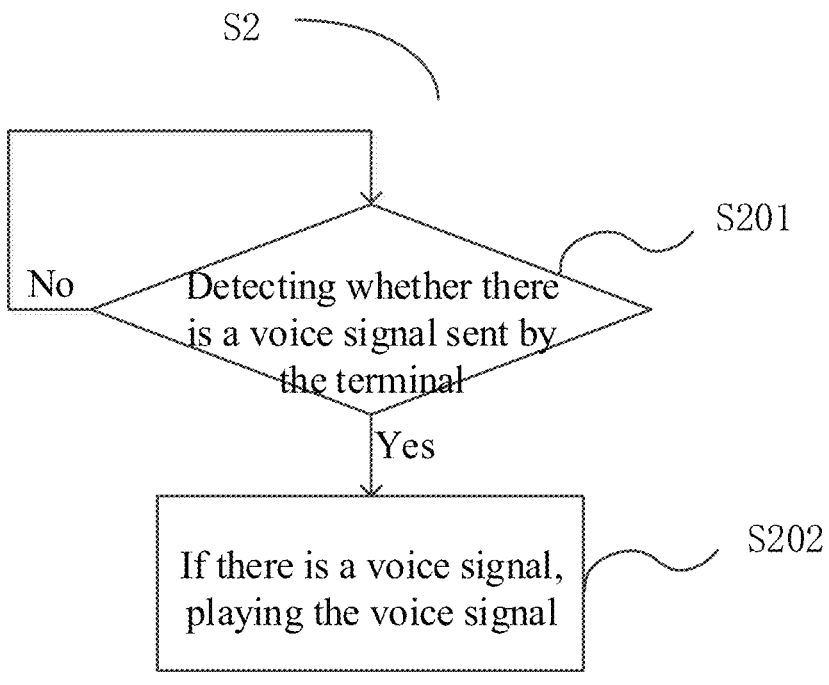
FIG. 2 illustrates a schematic flow chart of Step S2 according to an embodiment of the present application.

In an embodiment of the present application, as shown in FIG. 2, the method further comprises Step S201 and Step S202:

In Step S201, a detection on whether there is a voice signal sent by the terminal is performed; and In Step S202, if there is a voice signal, the voice signal is played.

For example, when a presenter is lecturing, the terminal corresponding to the presenter can send a voice signal to a terminal corresponding to a participant, and an interactive participant can also send a voice signal; therefore, in embodiments of the present application, it is possible to detect and play a voice signal, so as to facilitate interaction between the presenter and the participant and between the participants. It is to be noted that whether the media stream is displayed in a predetermined size in the first predetermined area only depends on whether the camera is ON, and even if a voice signal is received, it does not mean that the participant's information will be adjusted to the first predetermined area.

Figure 3:
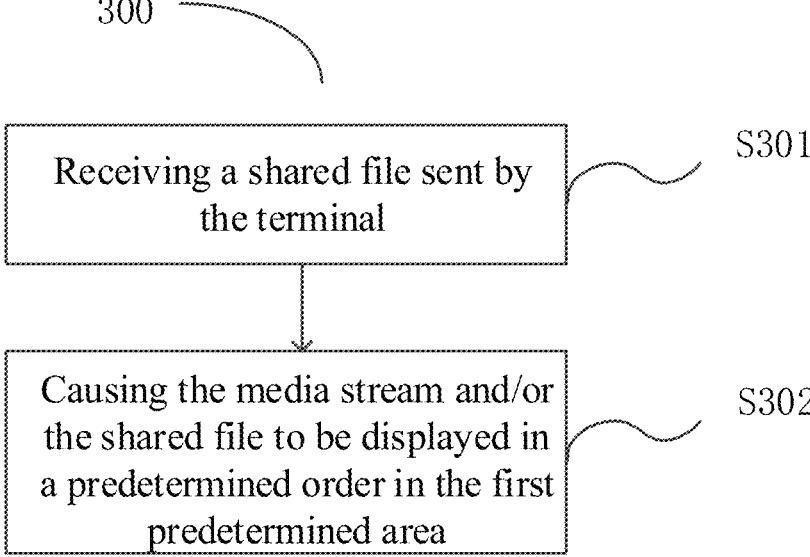
FIG. 3 illustrates a schematic flow chart of the display process of a shared file according to an embodiment of the present application.

In one embodiment of the present application, as shown in FIG. 3, a local terminal can also receive a shared file shared by a remote terminal. When there is both a media stream pushed by the remote terminal and a shared file, then the shared file and the media stream are displayed simultaneously in the first predetermined area. The shared file display process 300 comprises Step S301 and Step S302:

In Step S301, a shared file sent by the terminal is received.

In most cases, whether for meetings or lectures, the presenter needs to combine the shared file with his/her own language. Thus, embodiments of the present application support a mode in which participants view a shared file. The shared file is generally sent to the display interface for sharing by the presenter via a terminal used by himself/herself. In other examples, sharing may be performed by other participants, e.g. a participant in the interaction send a shared file to the display interface.

In Step S302, the media stream and/or the shared file are caused to be displayed in a predetermined order in the first predetermined area.

In one embodiment of the present application, if only a shared file is received and no media stream is received, only the shared file is displayed in the first predetermined area. If not only the shared file but also the video stream sent by a remote terminal are received, the video stream and the shared file can be arranged in a predetermined order, for example, all the video streams are displayed on the left side, the right side, or both the left and the right sides of the shared file. For the second predetermined area, the media streams are still displayed in a reduced size in the second predetermined area.

Figure 6A:
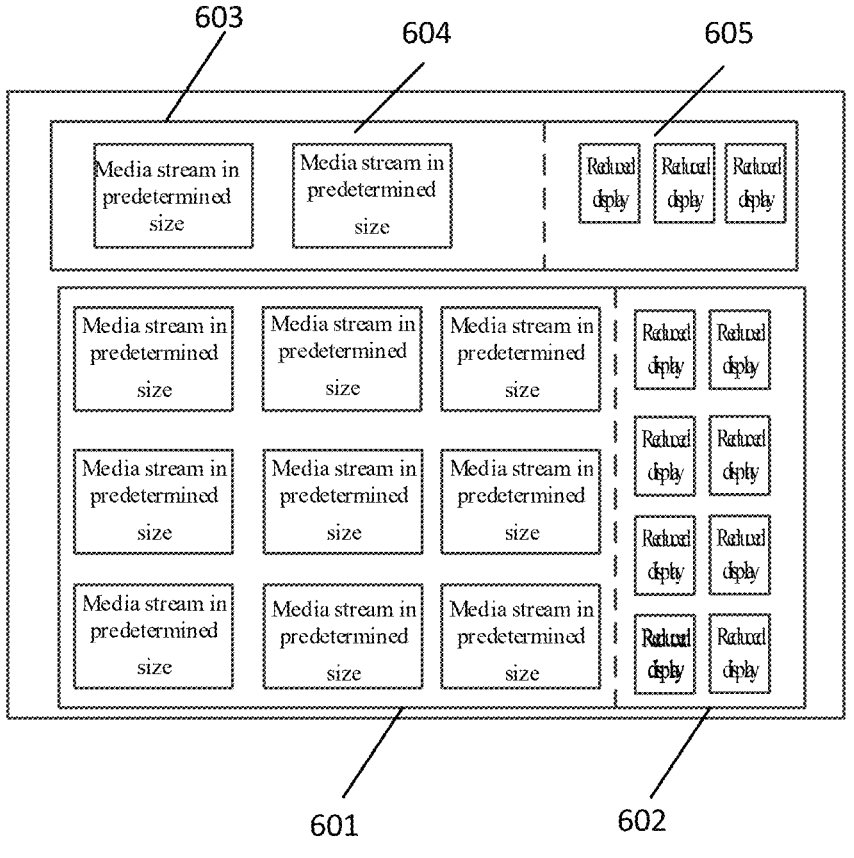
FIG. 6(a) illustrates a schematic diagram of the display method on the graphical interface of media streams in the first, second, third and fourth areas according to an embodiment of the present application.
Figure 6B:
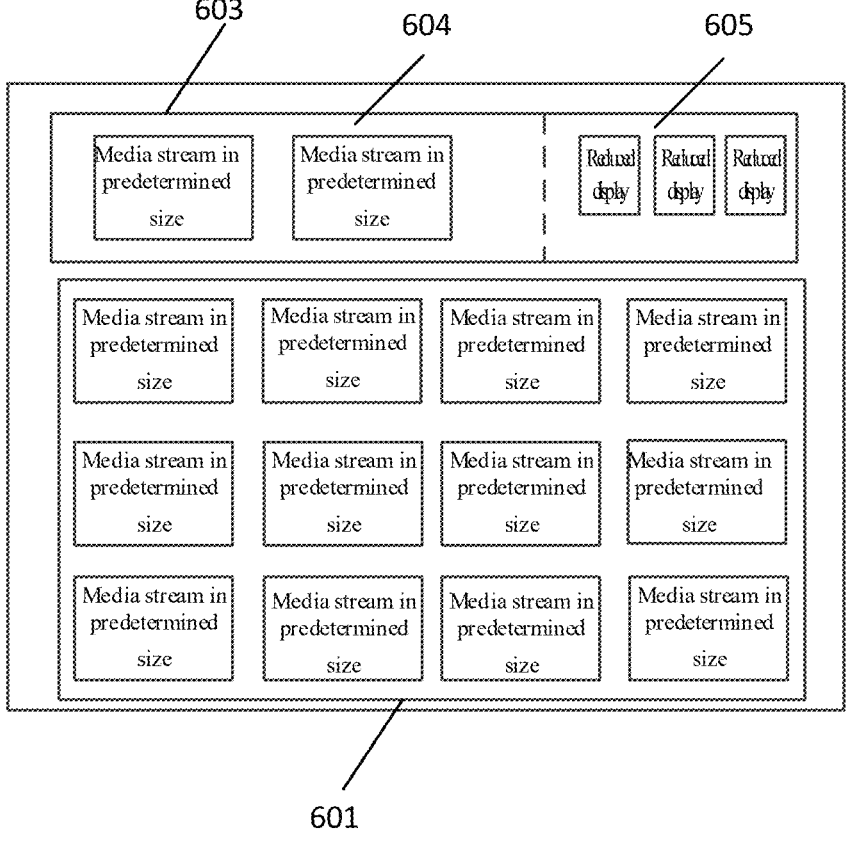
FIG. 6(b) illustrates a schematic diagram of the display method on the graphical interface of media streams in the first, second, third and fourth areas when the cameras in the recording zone are ON, according to an embodiment of the present application.
Figure 6C:
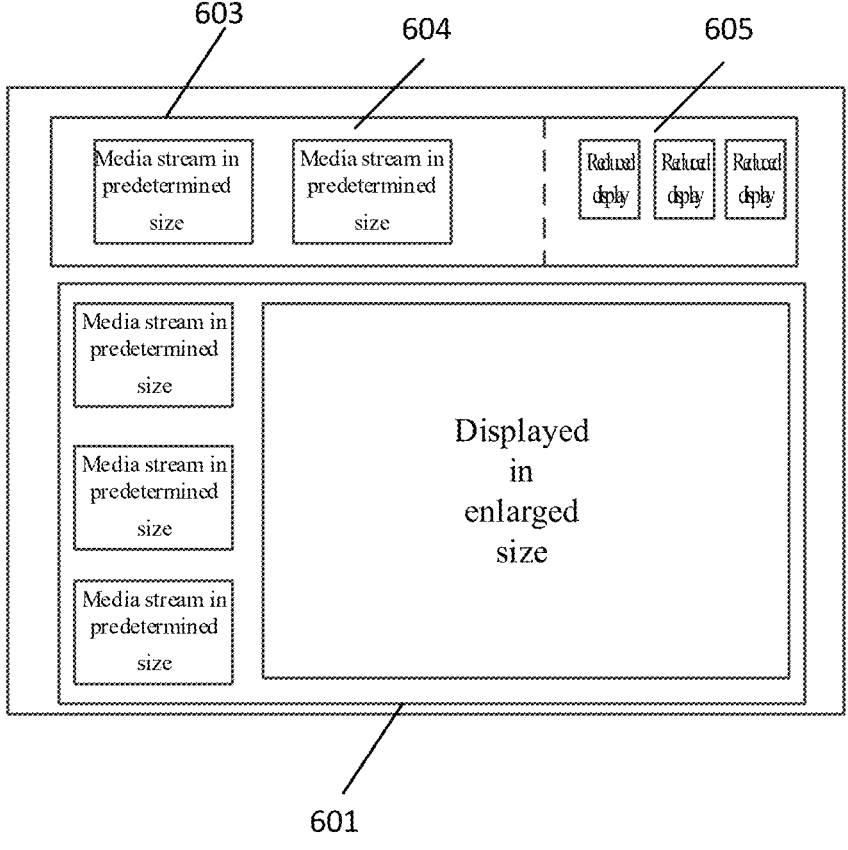
FIG. 6(c) illustrates a schematic diagram of displaying the media stream corresponding to the presenter or interacting person in an enlarged size in the first area according to an embodiment of the present application.
Figure 6D:
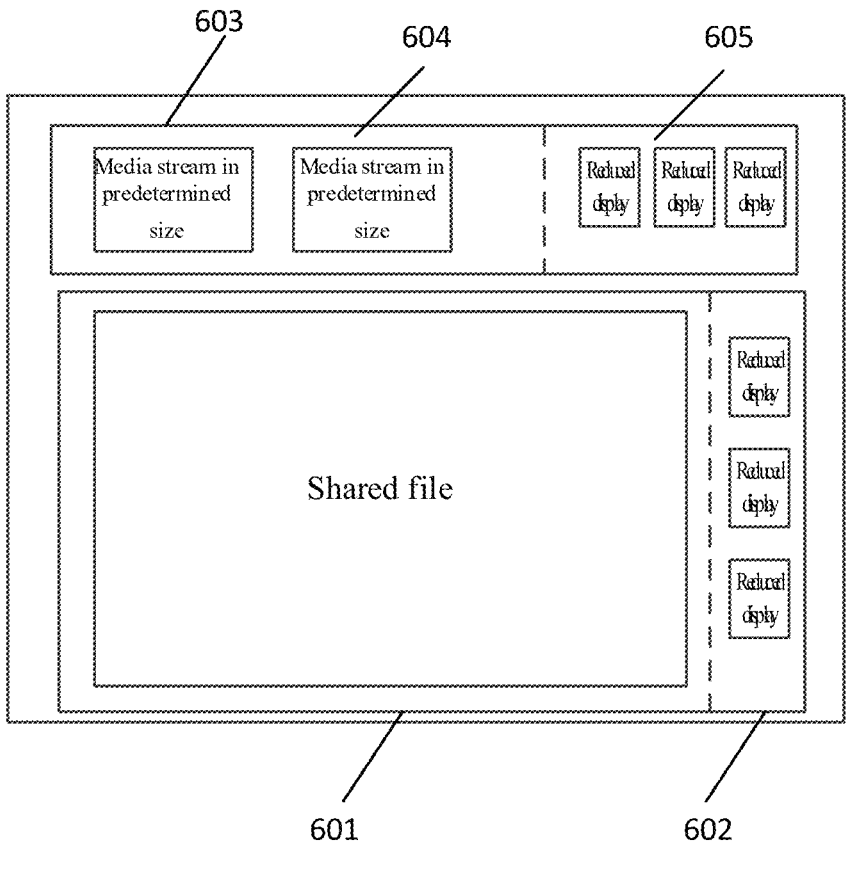
FIG. 6(d) illustrates a schematic diagram of displaying the shared file only in the first area according to an embodiment of the present application.
Figure 6E:
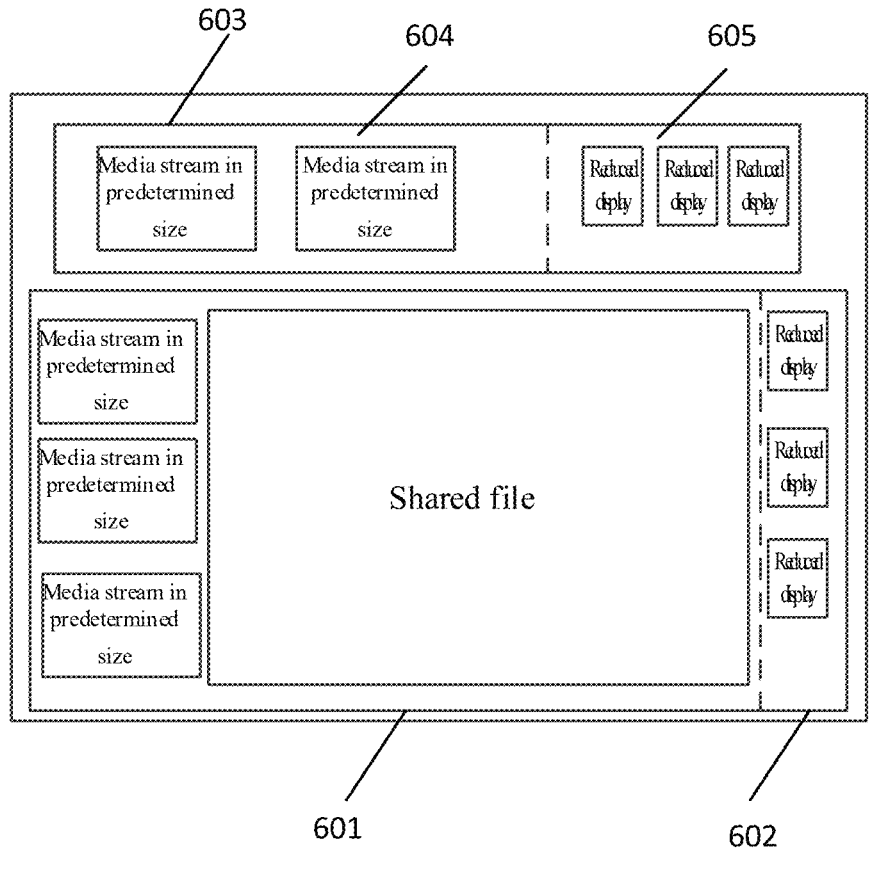
FIG. 6(e) illustrates a schematic diagram of displaying the shared file and the media streams together in the first area according to an embodiment of the present application.
Figure 6F:
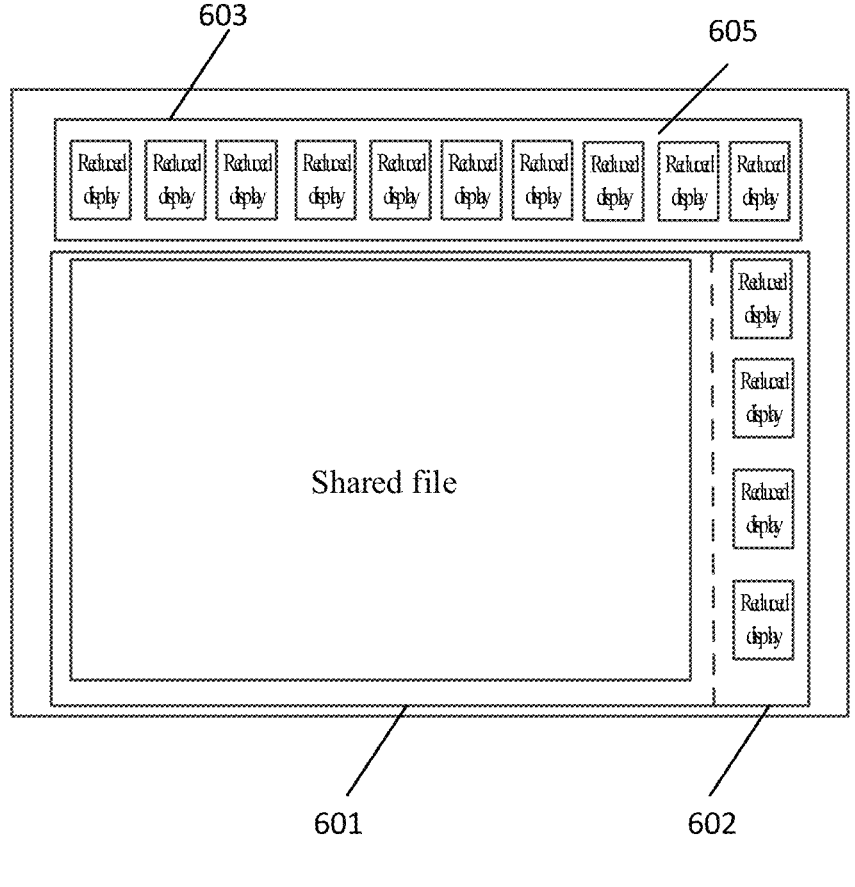
FIG. 6(f) illustrates a schematic diagram of displaying the shared file in the first area and displaying the media streams in a reduced size in the second and fourth areas according to an embodiment in the present application.
Figure 6G:
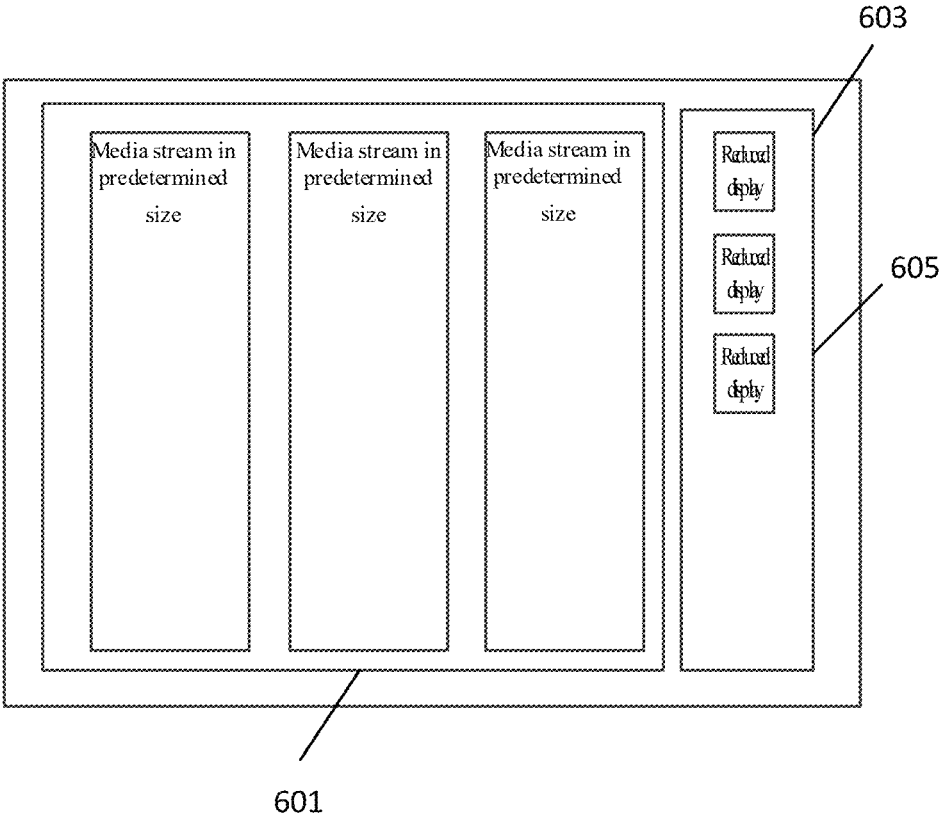
FIG. 6(g) illustrates a schematic diagram of adjusting the first area and the second area to the corresponding display scale when the display interface changes, according to an embodiment in the present application.
Figure 6H:
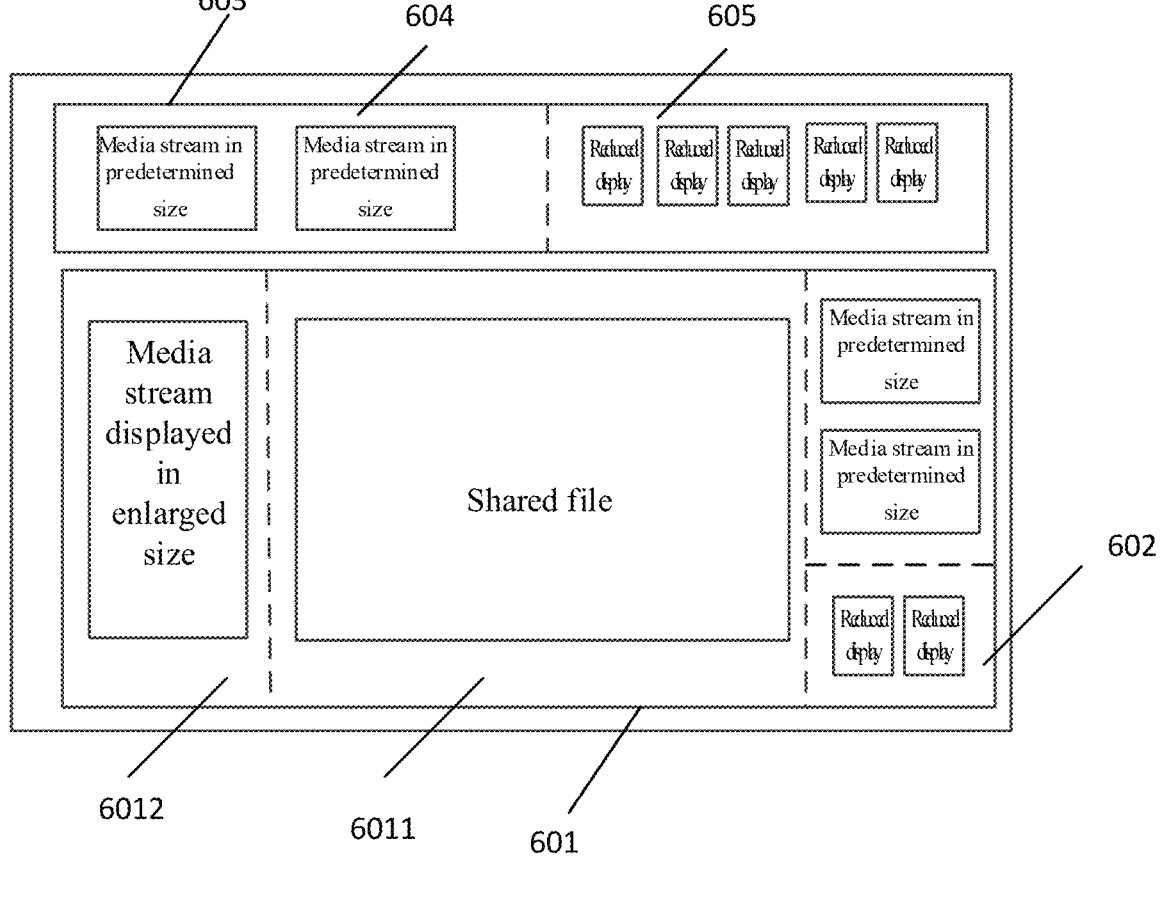
FIG. 6(h) illustrates a schematic diagram of the display interface when the second sub-area is located on the left side of the first sub-area and there is only one presenter, according to an embodiment of the present application.
Figure 6I:
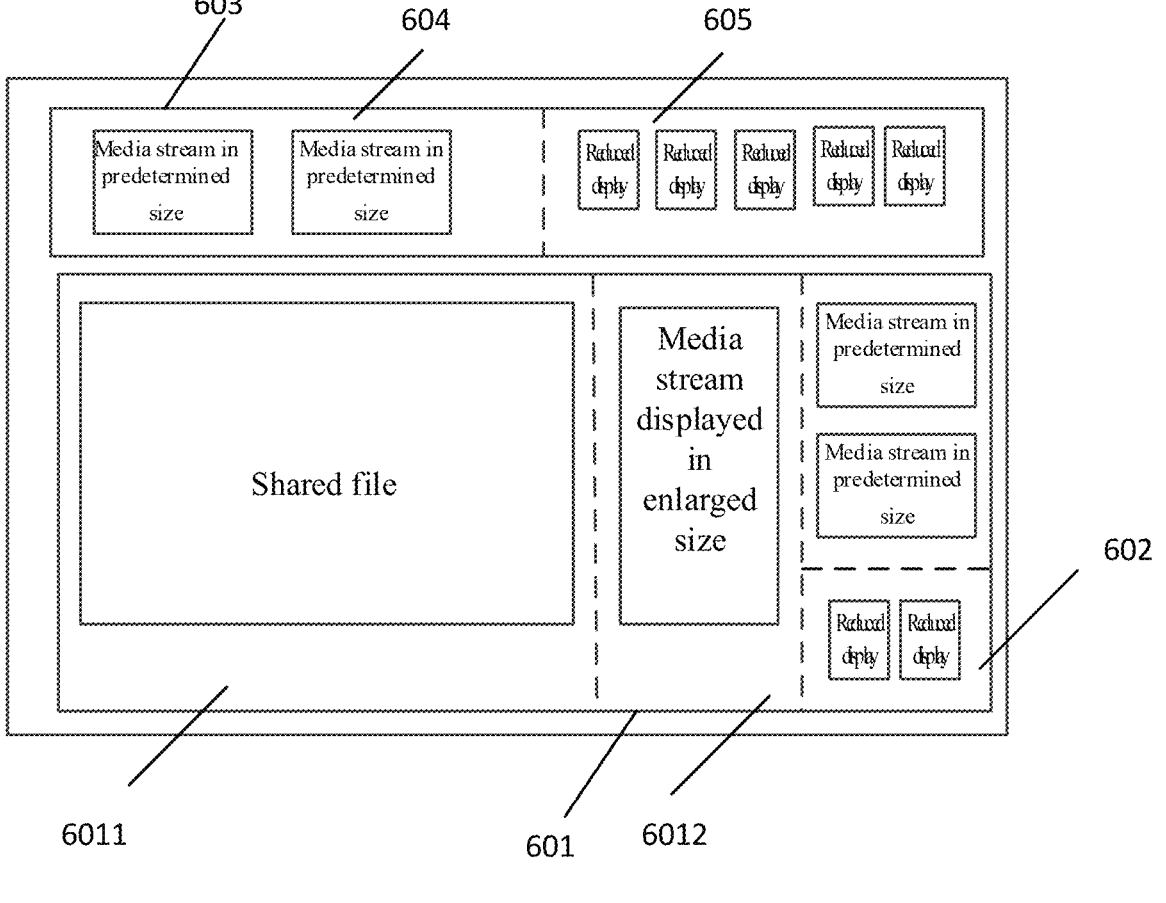
FIG. 6(i) illustrates a schematic diagram of the display interface when the second sub-area is located on the right side of the first sub-area and there is only one presenter, according to an embodiment of the present application.
Figure 6J:
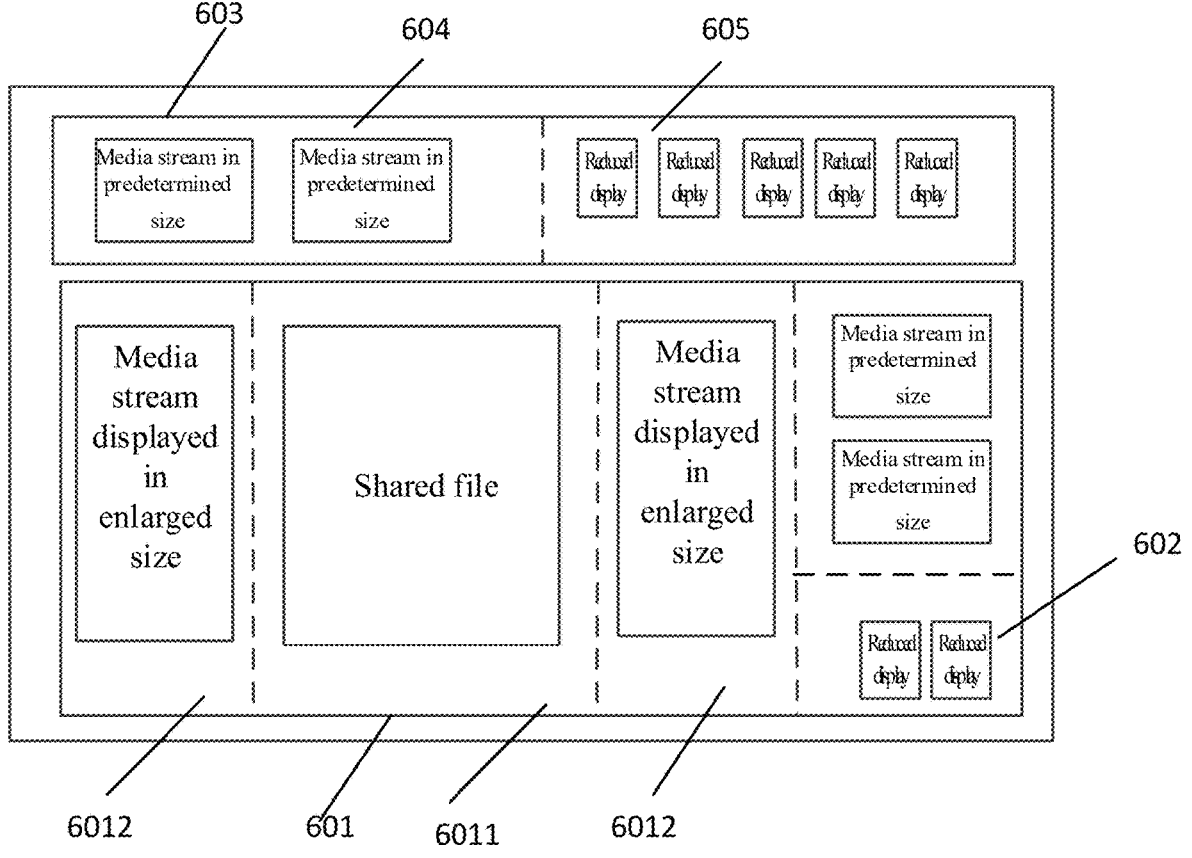
FIG. 6(j) illustrates a schematic diagram of the display interface when the second sub-area is located on both the left side and the right side of the first sub-area and there are two presenters, according to an embodiment of the present application.
Figure 6K:
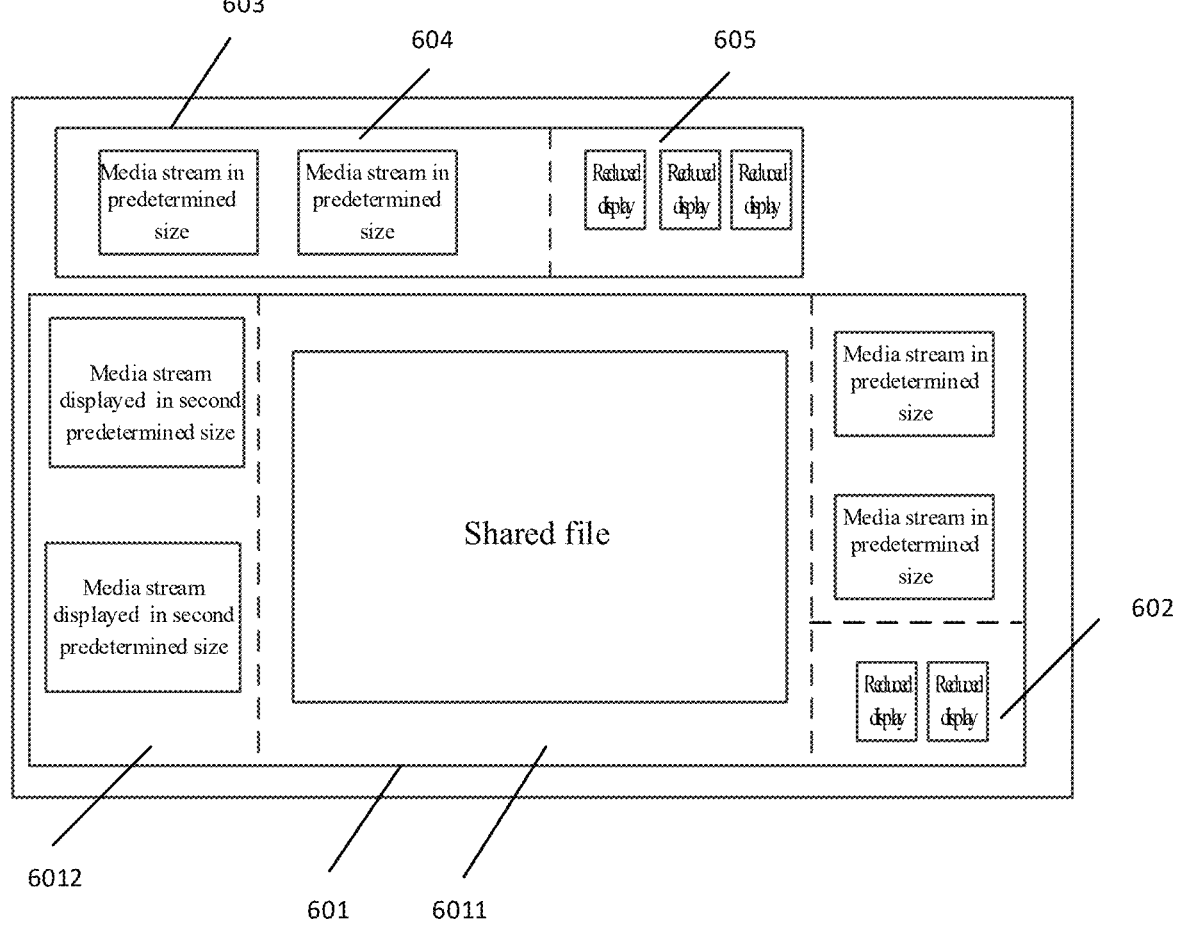
FIG. 6(k) illustrates a schematic diagram of the display interface when the second sub-area is located on the left side of the first sub-area and there are more than two presenters, according to an embodiment of the present application.
Figure 6:
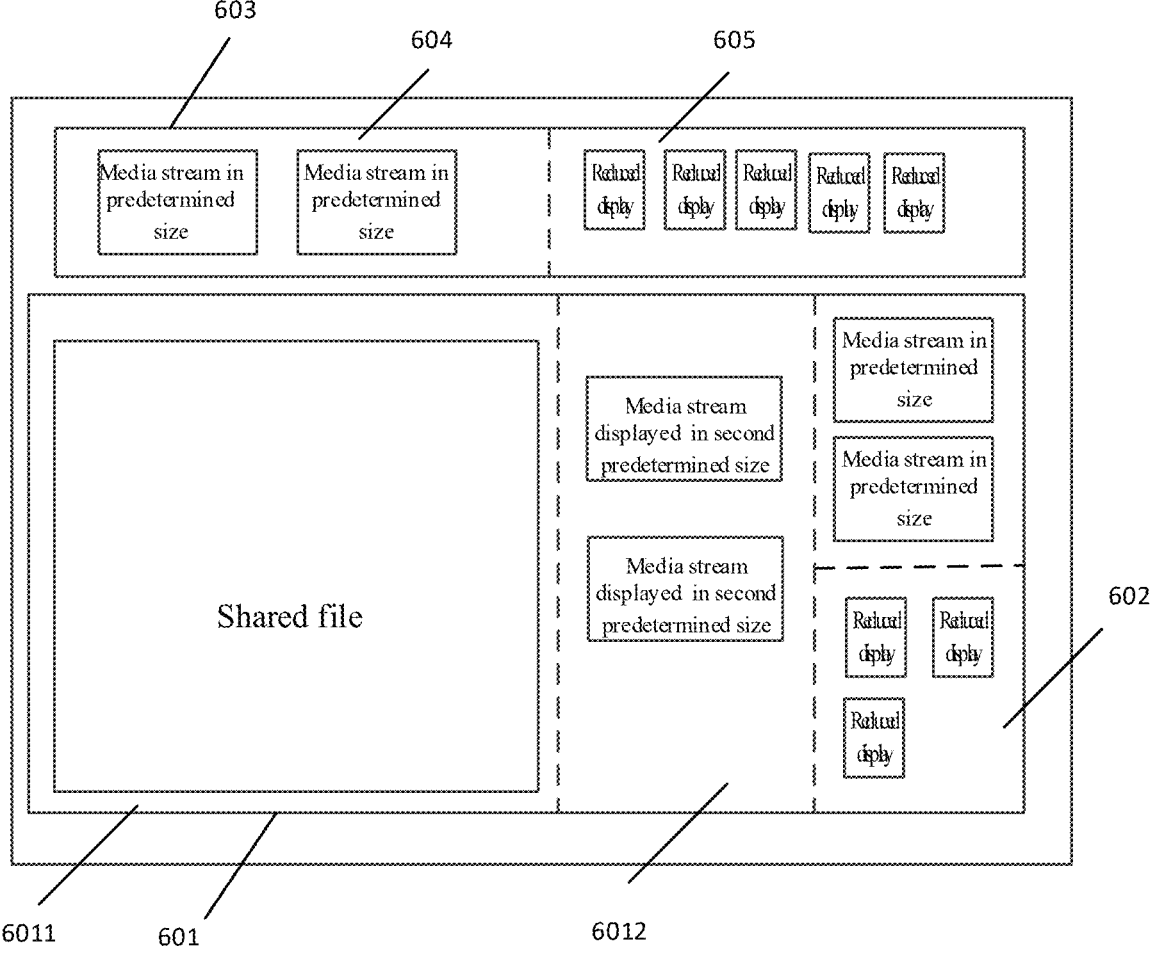
FIG. 6(l) illustrates a schematic diagram of the display interface when the second sub-area is located on the right side of the first sub-area and there are more than two presenters, according to an embodiment of the present application.
FIG. 6(m) illustrates a schematic diagram of the display interface when the second sub-area is located on both the left side and the right side of the first sub-area and there are more than two presenters, according to an embodiment of the present application.
Figure 6M:
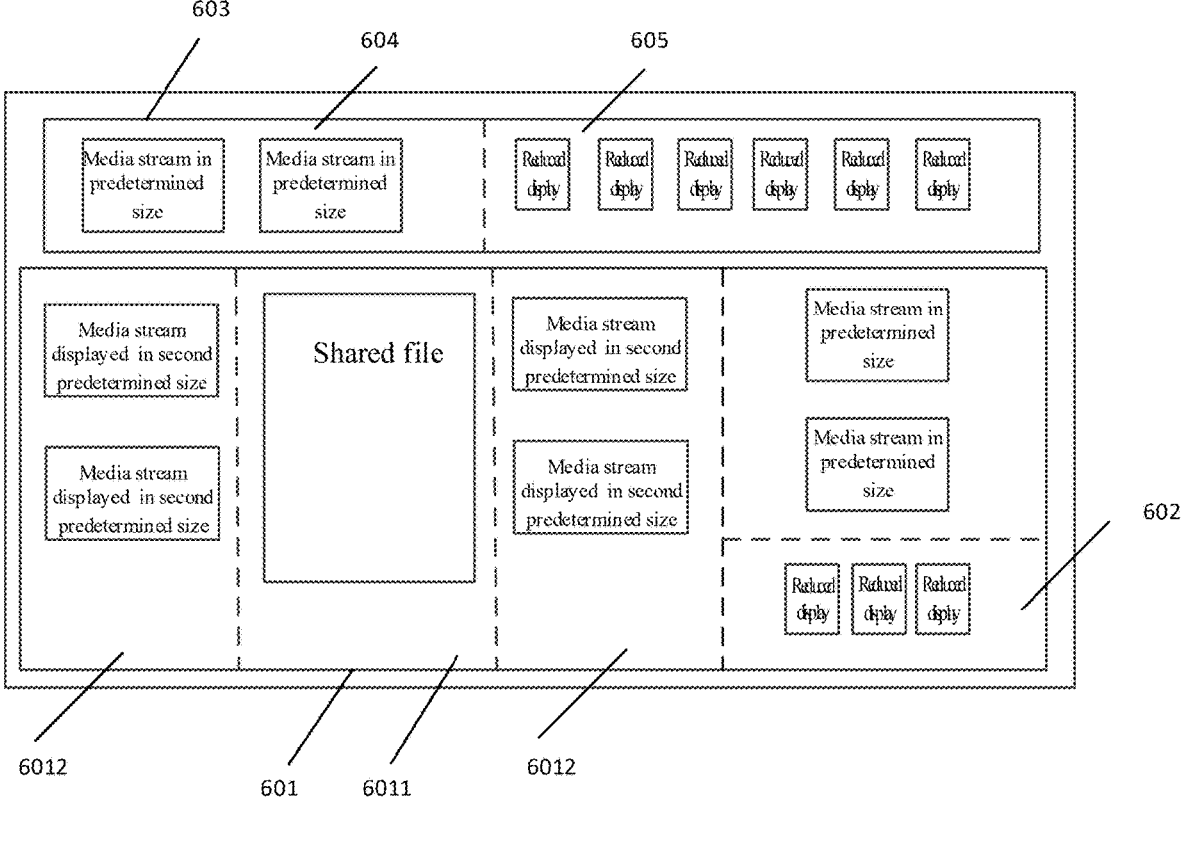

In one embodiment of the present application, the first predetermined area of the recording zone further comprises a first sub-area 6011 and a second sub-area 6012 (as shown in FIG. 6(*h*)), where the first sub-area 6011 is used for displaying the shared file, and the second sub-area 6012 is used for displaying the media stream or streams corresponding to at least one presenter (or live streamer, administrator, host); wherein the second sub-area 6012 is located to the left side and/or the right side of the first sub-area 6011.

In the embodiments of the present application, it is possible to highlight a presenter with a specific permission, for example, the presenter is displayed on the left side and/or the right side of the shared file, so that a participant (other than the presenter) can intuitively connect the presenter's voice and countenance with the shared file when viewing the shared file, so as to make the live broadcast more vivid.

In a further embodiment, the media stream or streams corresponding to the presenter or presenters are displayed in an enlarged size in the second sub-area 6012 when there are no more than two presenters; and the media streams of the presenters are displayed in a second predetermined size in the second sub-area 6012 when there are more than two presenters.

Due to the limitation of the size of the display area, when there are more than two presenters, the display size of the media stream corresponding to each presenter can be adjusted, and therefore it is possible to use the second predetermined size as a variable to determine the display size of the media stream corresponding to each presenter according to the number of presenters. The following describes how the display interface is displayed in the presence of different numbers of presenters with reference to FIGS. 6(*h*)-6(*m*). It should be noted that the following examples are intended to illustrate the present application only and not to be exhaustive, and other examples that can be derived from the technical schemes of the present application should also fall within the scope of the present application.

As a first example, in the display interface shown in FIG. 6(*h*), in the first area 601 of the recording zone, the media streams in a predetermined size are arranged in a certain order, for example, in chronological order of logging into the video conferencing software, or in alphabetical order of names. Similarly, the media streams of reduced display in the second area 602 of the recording zone can also be arranged in a certain order or sequence; the media streams in a predetermined size in the first area 604 of the non-recording zone 603 can be arranged in a certain order; and the media streams of reduced display in the second area 605 of the non-recording zone can also be arranged in a certain order or sequence.

The first predetermined area 601 in the recording zone further comprises a first sub-area 6011 and a second sub-area 6012, and the first sub-area 6011 is used for displaying the shared file, and the second sub-area 6012 is used for displaying the media stream or streams corresponding to at least one presenter (or administrator or live streamer); wherein, the second sub-area 6012 is located on the left side of the first sub-area 6011, in other words, the media stream corresponding to the presenter (or the video image sent by the terminal corresponding to the presenter) is displayed on the left side of the shared file.

As a second example, as shown in FIG. 6(*i*), the second sub-area 6012 is located on the right side of the first sub-area 6011. That is, the media stream corresponding to the presenter (or video image sent by the terminal corresponding to the presenter) is displayed on the right side of the shared file.

As a third example, as shown in FIG. 6(*j*), the second sub-area 6012 is located on both the left side and the right side of the first sub-area 6011. That is, the media stream corresponding to the presenter (or the video image sent by the terminal corresponding to the presenter) is displayed on both the left side and the right side of the shared file.

As a fourth example, as shown in FIG. 6(*k*), when the second sub-area 6012 is located on the left side of the first sub-area 6011 and there are multiple presenters, the media streams corresponding to the presenters may be displayed on the left side of the shared file. Due to the limitation of the size of the display area, each media stream is displayed in the second predetermined size. For example, if there are two presenters, the second sub-area 6012 can be divided into two parts for separate display. For another example, if there are three presenters, the second sub-area 6012 can be divided into three parts for separate display.

It is to be noted that when there are two presenters, they can be displayed respectively on the left side and the right side of the shared file, or both on the same side of the shared file, in the second predetermined size. The specific display method on the graphical interface depends on the user's software device.

As a fifth example, as shown in FIG. 6(*l*), when the second sub-area 6012 is located on the right side of the first sub-area 6011 and there are multiple presenters, the media streams corresponding to the presenters may be displayed on the right side of the shared file. Similarly, according to the number of presenters, the corresponding second sub-area can be divided into parts corresponding to the number of presenters.

As a sixth example, as shown in FIG. 6(*m*), when the second sub-area 6012 is located on both the left side and the right side of the first sub-area 6011, and there are multiple presenters, the media streams corresponding to the presenters may be displayed on both the left side and the right side of the shared file. Similarly, according to the number of presenters, the corresponding second sub-area can be divided into parts corresponding to the number of presenters, and details are not described herein again.

Wherein the shared file at least comprises: a document, a PPT presentation, a chart, a video, and/or a remote desktop. For example, a shared file can be a Word document, a PowerPoint presentation, an Excel chart, an mp4 video, a participant's live desktop and the like.

In Step S3, the media stream of the terminal is displayed in a reduced size in the second predetermined area.

For example, in the case when the camera of a remote terminal is OFF, indicating no media stream pushed to a local terminal by the remote terminal, the local terminal will select a default image to display locally, which represents the connection with the remote terminal, and thus will no longer display when the connection between the local terminal and the remote terminal is interrupted.

Wherein, the first area and the second area are adjoining, for example, the first area is on the left and the second area is on the right, or vice versa, or the first area is above and the second area is below, or vice versa.

In one embodiment of the present application, a non-recording zone is included in the area adjacent to the first area and the second area. The non-recording zone can be bounded by at least one edge of the recording zone. For example, the non-recording zone can be located above, below, to the left, to the right, OR at the top left, at the top right, at the bottom left, or at the bottom right, of the recording zone.

Wherein, it is possible to record the display content of the recording zone, but not the display content of the non-recording zone.

Wherein, the first predetermined area is further set as a recording zone first predetermined area located in a recording zone of the video conference and/or a non-recording zone first predetermined area located in a non-recording zone of the video conference; the second predetermined area is further set as a recording zone second predetermined area located in the recording zone of the video conference and/or a non-recording zone second predetermined area located in the non-recording zone of the video conference.

Wherein, participants have a plurality of identities such as presenter, panelist, etc., and different identities correspond to different permissions. The first predetermined area and the second predetermined area are respectively set as, a recording zone first predetermined area and a recording zone second predetermined area when the participant is a panelist, or a non-recording zone first predetermined area and a non-recording zone second predetermined area when the participant is not a panelist.

The panelist in the embodiments of the present application may be a participant with certain interaction permissions, and his/her corresponding media stream is generally displayed in the recording zone. Non-panelists can usually only watch the conference without interaction permissions, and their corresponding media streams are generally displayed in the non-recording zone. It is possible for the administrator, host or presenter to conduct identity setting operation to swap the identities of the panelist(s) and non-panelist(s).

When a participant is a non-panelist (e.g. a viewer or a spectator), as shown in FIG. 4, the process 400 for displaying the identity of a non-panelist may comprise Step S401 and Step S402:

In Step S401, when the camera of the terminal is ON, the media stream of the terminal is displayed in a predetermined size in the first predetermined area of the non-recording zone; and In Step S402, when the camera of the terminal is OFF, the media stream of the terminal is displayed in a reduced size in the predetermined second area of the non-recording zone.

In one embodiment of the present application, the identity of a participant may be such as host, presenter, spectator or viewer. Wherein, the host and the presenter are panelists, while the spectator and the viewer are non-panelists. Wherein, the host also acts as the administrator, who can send the meeting link to participants, so that the participants can directly join the video conference by clicking the meeting link.

Wherein, the presenter mainly gives a lecture, but can also give a lecture while presenting a shared file such as a PPT presentation.

Wherein, the spectator or the viewer may be in the default identity mentioned above. A viewer generally only has the permission to watch the content displayed in the first area and the second area, and no other permissions. In addition, a viewer's terminal will not push a media stream to a local terminal, and the spectator will be displayed only in the form of a default image on the local terminal. However, in special cases, the host or the presenter can change the permissions of a viewer, for example, to relocate the viewer from the non-recording zone to the recording zone, to allow the terminal corresponding to the viewer to push a media stream, or to allow interaction.

Wherein, a spectator, on the other hand, only has the permission to view the display content in the first area and the second area, and no other permissions. And the host or the presenter cannot adjust the permissions of the spectator.

In one embodiment of the present application, as shown in FIG. 5, when the display scale of the display interface changes, the display method 500 of the first area and the second area comprises Step S5:

In Step S5, the first area and the second area are adjusted to the corresponding display scale with the change of the display scale of the display interface.

In an embodiment of the present application, the display interface is arranged in a display with a landscape orientation, for example, the display scale is 16:9. As shown in FIGS. 6(a)-6(f), the media streams displayed in the first area 601 and the second area 602 are adapted to the display scale of the display interface. When the display is flipped into the portrait mode, the display interface also changes to portrait orientation, for example, when the display scale changes to 9:16, as shown in FIG. 6(g), then the display scale of the display content in the first area 601 and the second area 602 becomes adapted to the display scale of the display interface.

Several methods of presenting information of participants according to the embodiments of the present application are described below with reference to FIGS. 6(a)-6(g). It will be evident to those skilled in the art that the following description sets forth only a few, but not all exemplary embodiments of the present application. All examples consistent with the concepts of the present application are intended to be within the scope of the present application.

As shown in FIG. 6(a), the predetermined display method on the graphical interface can be the GridView. In the first area 601 of the recording zone, the media streams in a predetermined size are arranged in a certain order, for example, in chronological order of logging into the video conferencing software, or in alphabetical order of names. Similarly, the media streams of reduced display in the second area 602 can also be arranged in a certain order or sequence; the media streams in a predetermined size in the first area 604 of the non-recording zone 603 can be arranged in a certain order; and the media streams of reduced display in the second area 605 of the non-recording zone can also be arranged in a certain order or sequence.

As shown in FIG. 6(b), since the cameras of all remote terminals corresponding to the recording zone are ON, the media streams corresponding to all remote terminals other than the local terminal are displayed in the first area 601 according to the predetermined display method on the graphical interface, i.e. GridView. In one example, although there is no terminal with the camera turned off, the second area 602 can still be retained, but blank. In another example, when the second area 602 is blank, the display range of the first area 601 can be dynamically expanded according to the actual situation, that is, the display range of the original first area 601 can be expanded to the display range of the first area+the second area, with the second area 602 no longer displayed, so that the media streams can be arranged as much as possible without wasting the display area size.

For the first area 604 and the second area 605 of the non-recording zone 603, similar to the first area 601 and the second area 602 of the recording zone, the media streams in a predetermined size are displayed in the first area 604 of the non-recording zone 603, and the media streams of reduced display are displayed in the second area 605 of the non-recording zone 603. In one example, when there is no terminal with the camera turned off, the third area 604 of the non-recording zone 603 is retained, but the second area 605 of the non-recording zone 603 is blank. In another example, when the second area 605 is blank, the display range of the first area 604 of the non-recording zone 603 can be dynamically expanded according to the actual situation, that is, the display range of the original first area 604 can be expanded to the display range of the first area+the second area, with the second area 605 no longer displayed, so that the media streams can be arranged as much as possible without wasting the display area size.

As shown in FIG. 6(c), if there is a voice signal, the information of the participant corresponding to the terminal sending the voice signal is displayed in an enlarged size in the first area 601. For example, when a presenter is delivering a lecture, the media stream corresponding to the presenter will be displayed in an enlarged size in the first area 601. For another example, when a participant and a presenter are interacting, the terminals corresponding to the interacting participant and the presenter will send voice signals to the other terminals, and the media streams of the participant and the presenter can be displayed in an enlarged size side by side in the first area.

As shown in FIG. 6(*d*), when there is a shared file sent by a participant, the shared file can be displayed in the first area 601. In this case, if the camera state of the terminals in the recording zone is OFF, only the shared file will be displayed in the first area 601, and the media streams corresponding to the participants are displayed in a reduced size in the second area 602. The media streams in a predetermined size are displayed in the first area 604 of the non-recording zone, and the media streams corresponding to the participants in a reduced size are displayed in the second area 605.

As shown in FIG. 6(*e*), when there is a shared file sent by a participant, and there is a terminal whose camera state is ON, the media stream corresponding to the terminal whose camera state is ON is displayed together with the shared file in the first area 601. For example, media streams in a predetermined size appear on the left side of the first area, and a shared file appear on the right side of the first area. The second area is adjoining to the first area and to the right of the first area. The non-recording zone is located above the first area and the second area. The media streams in a predetermined size are displayed in the first area 604 of the non-recording zone, and the media streams corresponding to the participants in a reduced size are displayed in the second area 605.

As shown in FIG. 6(*f*), when there is a shared file sent by a participant, the shared file can be displayed in the first area 601. In this case, if the camera state of the terminals in the recording zone is OFF, only the shared file will be displayed in the first area 601, and the media streams corresponding to the participants are displayed in a reduced size in the second area 602. And the non-recording zone is located above the first area 601 and the second area 602. Since no camera is ON, the second area 605 is dynamically expanded, and the media streams corresponding to the participants are displayed in a reduced size in the second area 605, and the first area is not displayed.

As shown in FIG. 6(*g*), the first area 601 and the second area 602 are also adjusted to the corresponding display scale with the change of the display scale of the display interface. For example, as shown in FIGS. 6(*a*)-6(*f*), when the display interface is arranged in a display with a landscape orientation, the display scale is 3:2, and the media streams displayed in the first area 601 and the second area 602 are adapted to the display scale of the display interface. When the display is flipped into the portrait mode, the display interface also changes to portrait orientation, and the display scale changes to 2:3, then the scale of media streams in a predetermined size in the first area 601 will change, and the second area 602 can be displayed adjoining to the first area 601 and to the right side of the first area 601. The display of both the first area 604 and the second area 605 is similar, thus details thereof will not be described here again.

In an embodiment of the present application, with reference to FIGS. 6(*a*)-6(*g*), if there are a plurality of participants, for example, 50 participants, the display interface cannot display all the participants, then a scrolling bar may be arranged on one side of the display interface and is configured with a scrolling block which, when moves between the first end and the second end of the scrolling bar, will cause the content of the undisplayed area to be gradually displayed.

Disclosed in embodiments of the present application is a method for presenting information of video conference participants, which enables a participant to intuitively learn information about other participants, by showing their information in the first area or the second area presented locally based on the camera state of their respective terminals, thus greatly improving the conference communication efficiency and the user experience.

Figure 7:
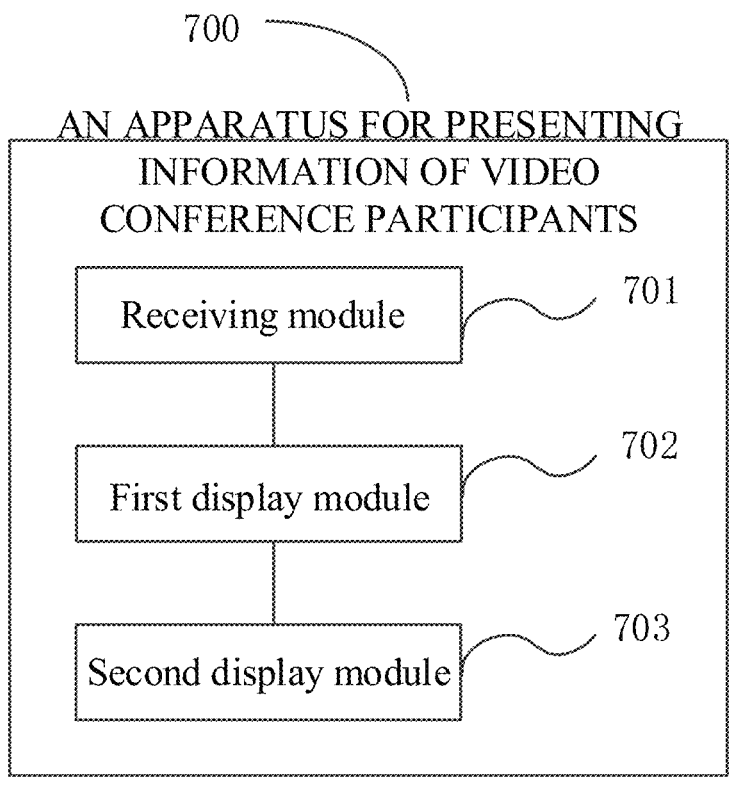
FIG. 7 illustrates a schematic block diagram of an apparatus for presenting information of video conference participants according to an embodiment of the present application.

FIG. 7 illustrates a schematic diagram of an apparatus for presenting information of video conference participants according to an embodiment of the present application. As shown in FIG. 7, the apparatus 700 for presenting information of video conference participants according to an embodiment of the present application may comprise: a receiving module 701, a first display module 702 and a second display module 703.

The receiving module 701 is configured to receive a media stream pushed by a terminal and determine the camera state of the terminal;

The first display module 702 is configured to display the media stream of the terminal in a predetermined size in a first predetermined area when the camera of the terminal is ON; and The second display module 703 is configured to display the media stream of the terminal in a reduced size in a second predetermined area when the camera of the terminal is OFF.

In one embodiment of the present application, the first predetermined area is further set as a recording zone first predetermined area located in a recording zone of the video conference and/or a non-recording zone first predetermined area located in a non-recording zone of the video conference; the second predetermined area is further set as a recording zone second predetermined area located in the recording zone of the video conference and/or a non-recording zone second predetermined area located in the non-recording zone of the video conference; and the first predetermined area and the second predetermined area are respectively set as, a recording zone first predetermined area and a recording zone second predetermined area when the participant is a panelist, or a non-recording zone first predetermined area and a non-recording zone second predetermined area when the participant is not a panelist.

In one embodiment of the present application, the first display module 702 comprises:

a detecting module (not shown in the FIG), configured to detect whether there is a voice signal sent by the terminal;

Further, according to the embodiments of the present application, there is provided a storage medium, having stored thereon program instructions, which, when executed by a computer or processor, will perform the corresponding steps of the method for presenting information of video conference participants as described in the embodiments of the present application. The storage medium may be, for example, a memory card of a smart phone, a storage part of a tablet computer, a hard disk of a personal computer, a read-only memory (ROM), an erasable programmable read-only memory (EPROM), a portable compact disk read-only memory (CD-ROM), a USB memory, or any combination thereof.

The storage medium of the embodiments of the present application has the same advantages as the method for presenting information of video conference participants discussed above because it can realize the method.

Although exemplary embodiments have been described herein with reference to the accompanying drawings, it is to be understood that the above-described exemplary embodiments are merely illustrative and are not intended to limit the scope of the present application. Numerous changes and modifications can be made therein by one of ordinary skill in the art without departing from the scope and spirit of the present application. All such changes and modifications are intended to be included within the scope of the present application as defined by the appended claims.

Those of ordinary skill in the art would recognize that the various illustrative units and algorithm steps described in connection with the embodiments disclosed herein may be implemented as electronic hardware, computer software, or combinations of both. Whether such functionality is implemented as hardware or software depends upon the particular application and design constraints imposed on the technical solution. Skilled artisans may implement the described functionality in varying ways for each particular application, but such implementation decisions should not be interpreted as causing a departure from the scope of the present application.

In the several embodiments provided herein, it should be understood that the disclosed apparatus and methods may be implemented in other ways. For example, the apparatus embodiments described above are only illustrative. For another example, the division of the units is only a logical function division, and there may be other divisions in actual implementation, for instance, a plurality of units or components may be combined or may be integrated into another system, or some features may be ignored or not implemented.

In the description provided herein, numerous specific details are set forth. However, it is understood that embodiments of the present application may be practiced without these specific details. In other instances, well-known methods, structures and techniques have not been shown in detail in order not to obscure the understanding of this description.

Similarly, it should be appreciated that in the description of exemplary embodiments of the present application, various features of the invention are sometimes grouped together in a single embodiment, figure, or description thereof for the purpose of streamlining the present application and aiding in the understanding of one or more of the various inventive aspects. This method of disclosure, however, is not to be interpreted as reflecting an intention that the claimed application requires more features than are expressly recited in each claim. Rather, as the following claims reflect, inventive aspects lie in less than all features of a single disclosed embodiment that may be implemented to solve a corresponding technical problem. Thus, the claims following the detailed description are hereby expressly incorporated into this detailed description, with each claim standing on its own as a separate embodiment of this invention.

It will be understood by those skilled in the art that all of the features disclosed in this specification (including the accompanying claims, abstract and drawings), and all of the processes or elements of any method or apparatus so disclosed, may be combined in any combination, except combinations where some of such features are mutually exclusive. Each feature disclosed in this specification (including any accompanying claims, abstract and drawings) may be replaced by alternative features serving the same, equivalent or similar purpose, unless expressly stated otherwise.

Furthermore, while some embodiments described herein include some but not other features included in other embodiments, combinations of features of different embodiments are meant to be within the scope of the present application, and form different embodiments, as would be understood by those skilled in the art. For example, in the claims, any one of the claimed embodiments may be used in any combination.

Various component embodiments of the present application may be implemented in hardware, or as software modules running on one or more processors, or on a combination thereof. That is, those skilled in the art will appreciate that a microprocessor or digital signal processor (DSP) may be used in practice to implement some or all of the functionality of some of the modules in embodiments of the present application. The present application may also be embodied as apparatus programs (e.g. computer programs and computer program products) for carrying out part or all of any of the methods described herein. Such programs embodying the present application may be stored on a computer-readable medium, or may be in the form of one or more signals. Such signals may be data signals downloadable from an Internet website, or provided on a carrier signal, or in any other form.

It should be noted that the above-mentioned embodiments illustrate rather than limit the present application, and that those skilled in the art will be able to design alternative embodiments without departing from the scope of the appended claims. In the claims, any reference signs placed between parentheses shall not be construed as limiting the claim. The word "comprising" does not exclude the presence of elements or steps other than those listed in a claim. The word "a", "an" or "one" preceding an element does not exclude the presence of a plurality of such elements. The present application may be implemented by means of hardware comprising several distinct elements, and/or by means of a suitably programmed processor. In the unit claim enumerating several means, several of these means may be embodied by one and the same item of hardware. The terms "first", "second", "third" and the like are not necessarily used herein to connote a specific order, and may be interpreted as names.

What has been described above is merely preferred embodiments or a description of the embodiments of the present application, and is not intended to limit the scope of the present application. Any modifications and substitutions that could be easily made by a person skilled in the art within the scope of the technology disclosed herein, should be within the scope of the present application. The scope of protection of the present application shall be determined by the claims.

What is claimed:

1. A method for presenting information of video conference participants, characterized in that the method comprises:

S1: receiving a media stream pushed by a terminal and determining a camera state of the terminal, if the camera state of the terminal is ON, then proceeding to S2; if the camera state of the terminal is OFF, then proceeding to S3;

S2: displaying the media stream of the terminal in a predetermined size in a first predetermined area; and S3: displaying the media stream of the terminal in a reduced size in a second predetermined area, wherein the first predetermined area and the second predetermined area are separate display areas, and wherein the first predetermined area and the second predetermined area are respectively set as a recording zone first predetermined area and a recording zone second predetermined area when the participant is a panelist, or a non-recording zone first predetermined area and a non-recording zone second predetermined area when the participant is not a panelist.

2. The method of claim 1, characterized in that the method further comprises:

receiving a shared file sent by the terminal; and causing the media stream and/or the shared file to be displayed in a predetermined order in the first predetermined area of the recording zone.

3. The method of claim 2, characterized in that the first predetermined area of the recording zone comprises a first sub-area and a second sub-area, where the first sub-area is used for displaying the shared file, and the second sub-area is used for displaying the media stream or streams corresponding to at least one presenter, wherein the second sub-area is located on a left side and/or a right side of the first sub-area.

4. The method of claim 3, characterized in that wherein the media stream or streams corresponding to the presenter or presenters are displayed in an enlarged size in the second sub-area when there are no more than two presenters; and the media streams of the presenters are displayed in a second predetermined size in the second sub-area when there are more than two presenters.

5. The method of claim 2, characterized in that wherein the shared file at least comprises: a document, a PPT presentation, a chart, a video, and/or a remote desktop.

6. The method of claim 1, characterized in that the method further comprises:

detecting whether there is a voice signal sent by the terminal; and if there is a voice signal, playing the voice signal.

7. The method of claim 1, characterized in that the method further comprises:

adjusting the first area and the second area to a corresponding display scale with a change of the display scale of a display interface.

8. An apparatus for presenting information of video conference participants, characterized in that the apparatus comprises:

a processor configured to receive a media stream pushed by a terminal and determine a camera state of the terminal, wherein the processor is further configured to display the media stream of the terminal in a predetermined size in a first predetermined area when the camera state of the terminal is ON, wherein the processor is further configured to display the media stream of the terminal in a reduced size in a second predetermined area when the camera state of the terminal is OFF, wherein the first predetermined area and the second predetermined area are separate display areas, and wherein the first predetermined area and the second predetermined area are respectively set as a recording zone first predetermined area and a recording zone second predetermined area when the participant is a panelist, or a non-recording zone first predetermined area and a non-recording zone second predetermined area when the participant is not a panelist.

9. A non-transitory computer readable storage medium, characterized in that, having stored thereon a computer program, which, when executed by a processor, causes the processor to carry out the method for presenting information of video conference participants as defined in claim 1.

10. The method of claim 1, characterized in that the method further comprises:

receiving a shared file sent by the terminal; and causing the media stream and the shared file to be displayed in a predetermined order in the first predetermined area.

11. The method of claim 1, characterized in that the first predetermined area comprises a first sub-area and a second sub-area, where the first sub-area is used for displaying a shared file, and the second sub-area is used for displaying the media stream corresponding to at least one presenter; wherein the second sub-area is located on a left side and/or a right side of the first sub-area.

12. The method of claim 11, characterized in that the media stream or streams corresponding to the presenter or presenters are displayed in an enlarged size in the second sub-area when there are no more than two presenters, and the media streams of the presenters are displayed in a second predetermined size in the second sub-area when there are more than two presenters.

13. The method of claim 10, characterized in that the shared file comprises at least one of: a document, a PPT presentation, a chart, a video, or a remote desktop.

14. A method for presenting information of video conference participants, characterized in that the method comprises:

S1: receiving a media stream pushed by a terminal and determining a camera state of the terminal, if the camera state of the terminal is ON, then proceeding to S2; if the camera state of the terminal is OFF, then proceeding to S3;

S2: displaying the media stream of the terminal in a predetermined size in a first predetermined area; and S3: displaying the media stream of the terminal in a reduced size in a second predetermined area, wherein the first predetermined area is further set as a recording zone first predetermined area located in a recording zone of the video conference and/or a non-recording zone first predetermined area located in a non-recording zone of the video conference; the second predetermined area is further set as a recording zone second predetermined area located in the recording zone of the video conference and/or a non-recording zone second predetermined area located in the non-recording zone of the video conference; and the first predetermined area and the second predetermined area are respectively set as, a recording zone first predetermined area and a recording zone second predetermined area when the participant is a panelist, or a non-recording zone first predetermined area and a non-recording zone second predetermined area when the participant is not a panelist.

* * * * *